No. 615,352. Patented Dec. 6, 1898.
H. GALLINOWSKY.
COMPOSITION FLOORING.
(Application filed July 25, 1898.)
(No Model.)
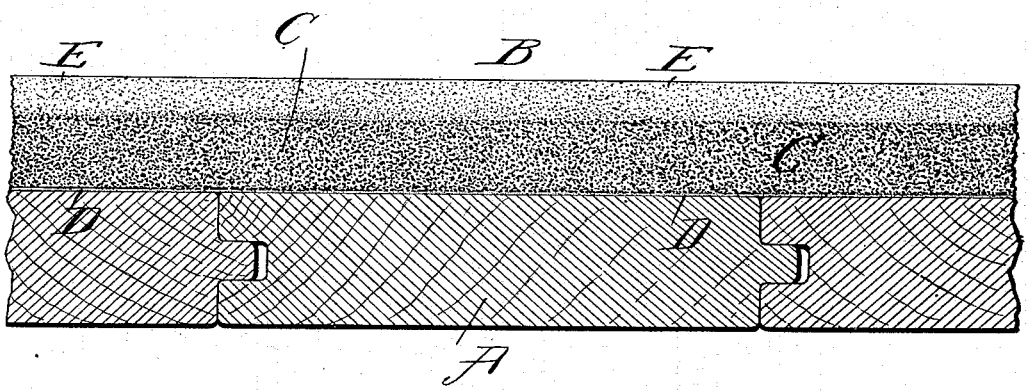
Attest:
Wm H Scott
Ralph Walsh
Inventor:
Hugo Gallinowsky
By Bakewell & Cornwall
Atty's.

UNITED STATES PATENT OFFICE.

HUGO GALLINOWSKY, OF ST. LOUIS, MISSOURI, ASSIGNOR TO THE LITHO-SITE MANUFACTURING COMPANY, OF SAME PLACE.

COMPOSITION FLOORING.

SPECIFICATION forming part of Letters Patent No. 615,352, dated December 6, 1898.

Application filed July 25, 1898. Serial No. 686,763. (No model.)

*To all whom it may concern:*

Be it known that I, HUGO GALLINOWSKY, a citizen of the United States, residing at the city of St. Louis, State of Missouri, have invented a certain new and useful Improvement in Composition Flooring, of which the following is a full, clear, and exact description, such as will enable others skilled in the art to which it appertains to make and use the same, reference being had to the accompanying drawing, forming part of this specification, in which the figure represents a sectional view of my improved composition floor.

This invention relates to a new and useful improvement in composition flooring, the object being to provide a flooring, made of a cementitious substance and a suitable filler, which will be waterproof and have practically the qualities of a Portland-cement flooring, the same being colored in any suitable or desired manner.

The essential features of this invention reside in arranging on the floor proper or a suitable support a filling-body which is bound to said support by a composition binder, the surface being of a finer grade of filling material, combined with a material, such as asbestos or mineral wool, which serves to strengthen the floor and at the same time to deprive it of the stone-like feeling and sound.

In the drawing, A indicates a suitable support, preferably in the form of tongue-and-grooved material, forming the floor proper, upon which is arranged my improved composition flooring B.

C indicates the body of my composition flooring, which consists, preferably, of a suitable filler in the form of sawdust, combined with a cementitious substance, in the proportions hereinafter set forth. Preparatory to spreading this filling-body on the floor proper I first paint or spread upon the floor proper a thin coating of the cementitious substance, as at D, which coating is in a plastic state, and then, before the same hardens, place thereon the filler C, after which a finishing-body E, also in a plastic state, is spread upon the body C, rolled out, and left to harden, which hardening occurs in a short time.

The binding substance D consists, preferably, of an oxychlorid cement, prepared by combining a solution of chlorid of magnesium with oxid of magnesium in about the proportion of one pint of the former to one pound of the latter, or this cementitious substance may be formed by concentrating a solution of bittern, consisting, essentially, of chlorid of magnesium, after which the dry product of bittern is intimately mixed or ground with oxid of magnesium, (calcined magnesite,) when this mixed product may be combined with water and used in a plastic state.

For the filling-body C, I take a quantity of sawdust—say one-half pound of pine sawdust or one pound of oak sawdust—and mix the same with one pound of oxid of magnesium in a dry state. I then add one pint of the solution of chlorid of magnesium, mixing the same thoroughly, after which the filler is spread in position while in a plastic state, as before mentioned.

For the surface E, I take one pound of oxid of magnesium in a dry state and mix with the same one and one-half pounds of dry powdered asbestos, or one pound of powdered soapstone in a dry state, or mineral wool, and to this dry mixture I add one and one-half pints of solution of chlorid of magnesium, into which a coloring-matter has been previously introduced. This finishing-surface is now spread upon the filler and rolled or otherwise manipulated to make a smooth and even surface, after which it is left to harden. I may also incorporate into this finishing-coat E any suitable design, made of differently-colored bodies of the same character of material, or I may employ mosaic work, if desired.

I am aware that minor changes in the materials of which this floor is composed can be made and substituted for those herein shown and described without in the least departing from the nature and principle of my invention.

Having thus described my invention, what I claim, and desire to secure by Letters Patent, is—

1. The herein-described composition floor comprising a suitable support of wood or other material, a body of filling material which is bound to said support by an oxychlorid cement, and a coating of finishing material, consisting of an oxychlorid cement combined with asbestos, or other suitable filler, substantially as described.

2. The herein-described floor comprising, in combination with a suitable support, a coating of oxychlorid cement composed of oxid of magnesium and chlorid of magnesium mixed in about the proportions specified, a filling-body composed of sawdust, oxid of magnesium, and a solution of chlorid of magnesium mixed in the manner and in about the proportions specified, and a coating for the surface composed of oxid of magnesium combined with asbestos, or other suitable filler, and a solution of chlorid of magnesium containing coloring-matter, mixed in the manner and in about the proportions specified, substantially as described.

In testimony whereof I hereunto affix my signature, in the presence of two witnesses, this 4th day of May, 1898.

HUGO GALLINOWSKY.

Witnesses:
F. R. CORNWALL,
HUGH K. WAGNER.